US009025946B2

(12) United States Patent
Kikuchi (10) Patent No.: US 9,025,946 B2
(45) Date of Patent: May 5, 2015

(54) CAMERA SYSTEM AND FOCUS DETECTING METHOD

(71) Applicant: Olympus Corporation, Shibuya-ku, Tokyo (JP)

(72) Inventor: Tetsuo Kikuchi, Hachioji (JP)

(73) Assignee: Olympus Corporation, Tokyo (JP)

( * ) Notice: Subject to any disclaimer, the term of this patent is extended or adjusted under 35 U.S.C. 154(b) by 13 days.

(21) Appl. No.: 14/276,152

(22) Filed: May 13, 2014

(65) Prior Publication Data

US 2014/0341553 A1    Nov. 20, 2014

(30) Foreign Application Priority Data

May 14, 2013  (JP) .................................. 2013-101962

(51) Int. Cl.
| | |
|---|---|
| *G03B 17/00* | (2006.01) |
| *G03B 13/00* | (2006.01) |
| *G02B 7/28* | (2006.01) |
| *G03B 13/36* | (2006.01) |

(52) U.S. Cl.
CPC ................ *G02B 7/282* (2013.01); *G03B 13/36* (2013.01)

(58) Field of Classification Search
CPC .......... G02B 7/102; G02B 7/36; G03B 17/14; H04N 5/23296; H04N 5/23212
USPC ..................... 396/81, 72, 79, 80, 82, 85, 529; 348/240.99, 345, 347, 353
See application file for complete search history.

(56) References Cited

U.S. PATENT DOCUMENTS

| | | | | |
|---|---|---|---|---|
| 2010/0066864 | A1* | 3/2010 | Abe | 348/240.3 |
| 2011/0115939 | A1* | 5/2011 | Hamada | 348/222.1 |
| 2012/0274832 | A1* | 11/2012 | Hitosuga | 348/333.11 |
| 2012/0307134 | A1* | 12/2012 | Morimoto | 348/360 |

FOREIGN PATENT DOCUMENTS

JP      2000-258680      9/2000

* cited by examiner

*Primary Examiner* — Rochelle-Ann J Blackman
(74) *Attorney, Agent, or Firm* — John C. Pokotylo; Straub & Pokotylo (57) ABSTRACT

A camera system according to the present invention, comprising: an interchangeable lens comprising: a zoom position detecting section configured to detect a zoom position corresponding to a focal length of the photographing optical system; and a lens control section configured to input the zoom position and transmit it to the camera body, and a camera body comprising: a body control section configured to communicate with the lens control section, a focus detecting section configured to detect an in-focus position of a focus lens included in the photographing optical system, and a zoom position memory section configured to memorize the zoom position which is transmitted from the lens control section and received by the body control section, wherein when transmitting the in-focus position to the lens control section, the body control section transmits the memory zoom position memorized in the zoom position memory section to the lens control section.

14 Claims, 7 Drawing Sheets

CAMERA SYSTEM AND FOCUS DETECTING METHOD

Benefit is claimed, under 35 U.S.C. §119, to the filing date of prior Japanese Patent Application No. 2013-101962 filed on May 14, 2013. This application is expressly incorporated herein by reference. The scope of the present invention is not limited to any requirements of the specific embodiments described in the application.

BACKGROUND OF THE INVENTION

1. Field of the Invention

The present invention relates to a camera system which includes a photographing optical system capable of changing a focal length and performs automatic focus adjustment of the photographing optical system and to a focus adjusting method.

2. Description of Related Art

Camera systems adopting zoom tracking have been proposed (refer to Japanese Unexamined Patent Publication No. 2000-258680 (hereinafter, referred to as Patent Document 1)). In the case where zooming is performed for an object to be photographed, the zoom tracking is a method of driving a focus lens in conjunction with a zoom lens.

SUMMARY OF THE INVENTION

If the zoom tracking is adopted, on the condition that an object is in focus, the zoom tracking is configured to perform zooming while keeping the in-focus, which is convenience. However, if the zoom tracking is performed at the zoom lens side during scan operation for performing focus adjustment with contrast AF, in-focus position driving is stopped, and zoom tracking control is performed with priority. Accordingly, an object sometimes becomes out of focus at the time of a main exposure.

Figure 7:
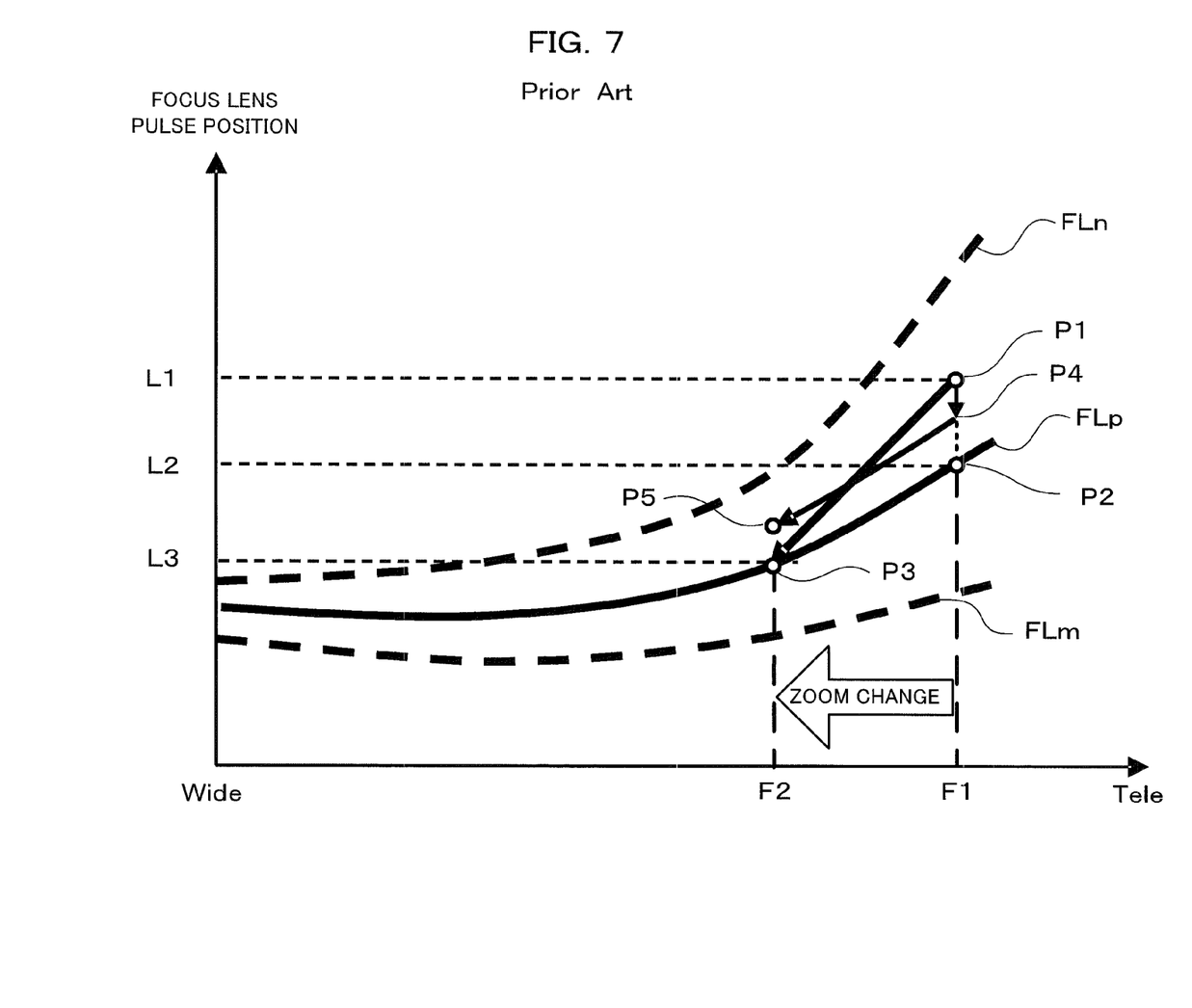
FIG. 7 is a diagram to describe the in-focus operation of a focus lens in a conventional camera system.

Description is given to this point with reference to FIG. 7. In a graph shown in FIG. 7, the horizontal axis represents the focal length of a zoom lens. The right side is a telephoto side, and the left side is a wide angle side. The vertical axis represents a focus lens pulse position from the reference position of a focus lens. The pulse position corresponds to a focus lens position. Focal lengths and focus lens pulse positions corresponding to each of tracking curves FLm, FLp, and FLn used to perform zoom tracking are memorized in a memory section. The tracking curve FLm corresponds to the closest position of the focus lens, and the tracking curve FLn corresponds to the infinite position of the focus lens. Further, the tracking curve FLp shows a position of the focus lens corresponding to an arbitrary distance between the closest position and the infinite position.

With regard to the tracking curve, in addition to three curves FLm, FLp, and FLn shown in FIG. 7, the data of multiple curves are memorized in the memory section. Each of F1 and F2 on the horizontal axis represents a focal length. Further, L2 on the vertical axis represents one example of a current focus lens position. In this example, L2 represents an in-focus position detected by a scan operation (in the case of no change in zooming), and L3 represents a true focus lens position to be driven after the changing of zooming.

A position P1 represents a current focus lens position, and a position P2 represents an in-focus position detected by the scan operation with contrast AF. Accordingly, if a driving section drives a focus lens from the position P1 toward the position P2, it becomes possible to drive the focus lens to the in-focus position. Incidentally, when the in-focus is made at the position P2, a user may perform zooming from the focal length F1 to F2. In this case, if the focus lens is driven so as to move from the position P2 along the tracking curve FLp to the position P3, the in-focus state can be maintained even if the focal length is changed to F2.

On the other hand, during in-focus driving, a user may perform zooming. For example, it is supposed that, at a position P4 in the course of the driving from the position P1 to the in-focus position (P2), a user has performed zooming from the focal length F1 to the focal length F2. According to the conventional zoom tracking method, the in-focus operation is stopped at the position P4, and then a zoom tracking operation is performed. That is, since the focus lens performs zoom tracking at the position P4, the focus lens is driven along a tracking curve almost parallel to the tracking curve FLp. As a result, the focus lens stops at a position P5 corresponding to the focal length F2, so that the focus lens cannot be driven to a position (P3) becoming in focus. In this way, in such a conventional zoom tracking method, if a user performs zooming during the driving to an in-focus position, the focus lens is driven to the position P5 against the position P3 serving as a true in-focus position, which results in that the focus lens deviates from the in-focus position.

An object of the present invention is to provide a camera system capable of driving to a true in-focus position even if a focal length is changed during the driving to an in-focus position and a focus adjusting method.

A camera system according to the present invention includes an interchangeable lens having a photographing optical system capable of changing a focal length; and a camera body to which the interchangeable lens is detachably attached, the interchangeable lens comprising: a zoom position detecting section configured to detect a zoom position corresponding to a focal length of the photographing optical system; and a lens control section configured to input the zoom position and transmit it to the camera body, and the camera body comprising: a body control section configured to communicate with the lens control section, a focus detecting section configured to detect an in-focus position of a focus lens included in the photographing optical system, and a zoom position memory section configured to memorize the zoom position which is transmitted from the lens control section and received by the body control section, wherein when transmitting the in-focus position to the lens control section, the body control section transmits the memory zoom position memorized in the zoom position memory section to the lens control section.

A focus adjusting method according to the present invention is a focus adjusting method for a camera system which includes an interchangeable lens having a photographing optical system capable of changing a focal length and a camera body to which the interchangeable lens is detachably attached, the focus adjusting method comprising the steps of: transmitting, by the camera body, an in-focus position of a focus lens included in the photographing optical system at the time of focus adjustment and a memory zoom position to the interchangeable lens, comparing, by the interchangeable lens, the memory zoom position with a current zoom position upon receipt of the memory zoom position, and correcting the in-focus position in the case where the memory zoom position is different from the current zoom position as a result of comparison in the comparing step.

DETAILED DESCRIPTION OF THE PREFERRED EMBODIMENTS

Figure 1:
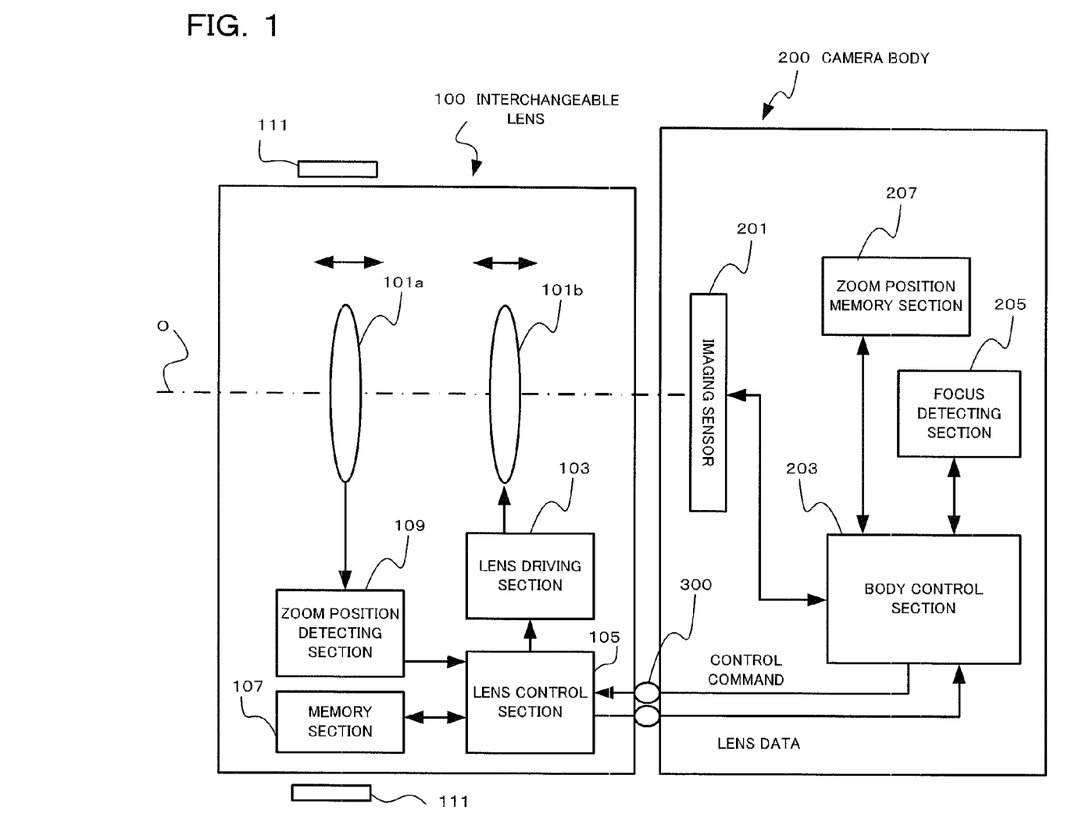
FIG. 1 is a block diagram showing mainly the electric constitution of a camera system according to one embodiment of the present invention.

Hereinafter, in accordance with drawings, description will be given to a preferable embodiment to use a camera system to which the present invention is applied. FIG. 1 is a block diagram showing mainly an electric constitution of a camera system according to one embodiment of the present invention. The camera system includes an interchangeable lens 100 having a photographing optical system capable of changing a focal length and a camera body 200 to which the interchangeable lens is detachably attached.

In the interchangeable lens 100, photographing lenses 101a and 101b (which are called 101 at the time of naming collectively these photographing lenses) are arranged so as to constitute the photographing optical system. These photographing lenses 101a and 101b are movable separately along an optical axis O direction by a lens driving section 103. By this lens driving section 103, the respective positions of the photographing lenses 101a and 101b are changed.

Around the outer periphery of the interchangeable lens 100, a zoom ring 111 is mounted rotatably. When a user rotates the zoom ring 111 manually, the respective positions of the photographing lenses 101a and 101b are changed, whereby a focal length is changed.

The lens driving section 103 is coupled to a lens control section 105, and this lens control section 105 is configured to control the driving of the lens driving section 103. The lens control section 105 includes circuits, such as a CPU and an ASIC, and controls the interchangeable lens 100 in according with programs memorized in a memory section 107. At the time of controlling the interchangeable lens 100, the lens control section 105 communicates with a body control section 203 in the camera body 200 via communication terminals 300, and performs control in response to control instructions from the camera body 200.

Figure 6:
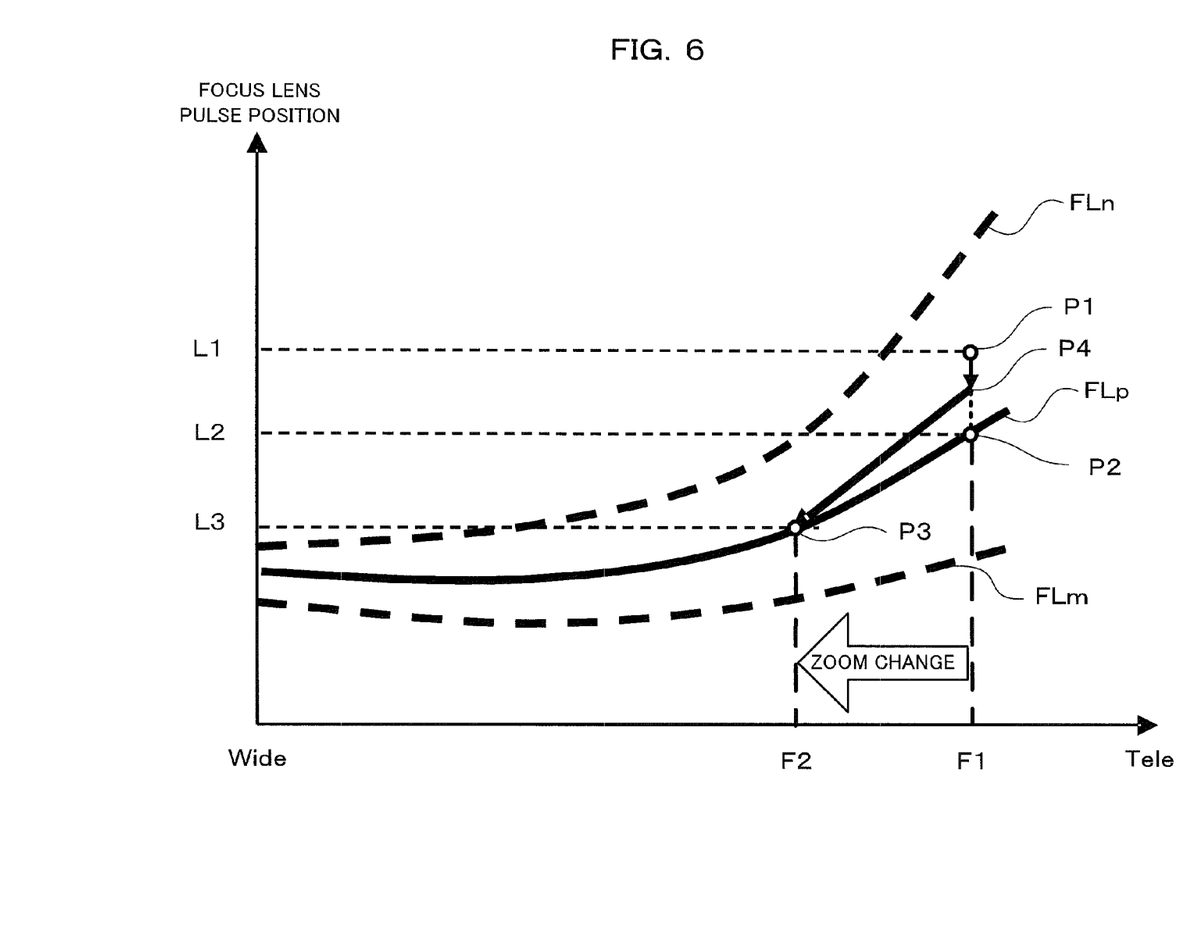
FIG. 6 is a diagram to describe the in-focus operation of a focus lens in the camera system according to one embodiment of the present invention.

The memory section 107 is coupled to the lens control section 105, and in the memory section 107, various adjustment values of the interchangeable lens 100 are memorized besides the above-mentioned control programs. Further, the memory section 107 also memorizes information about zoom tracking curves. As the information about zoom tracking curves, a table composed of respective combinations of focal lengths and focus lens positions is memorized for each of tracking curves FLm, FLp, and FLn as shown in FIG. 6. In FIG. 6, the tracking curve FLm corresponds to the closest position of a focus lens, and the tracking curve FLn corresponds to the infinite position of the focus lens. Further, the tracking curve FLp shows a position of the focus lens which becomes in focus in response to a zoom position on a predetermined distance between the closest position and the infinite position.

A zoom position detecting section 109 is coupled to the lens control section 105, and is configured to detect a zoom position corresponding to a focal length of the photographing optical system based on the respective positions of the photographing lenses 101a and 101b, and to output the zoom position to the lens control section 105. The lens control section 105 transmits the input zoom position to the camera body 200.

In the camera body 200 to which the interchangeable lens 100 can be attached, an imaging sensor 201, the body control section 203, a focus detecting section 205, and a zoom position memory section 207 are arranged. The imaging sensor 201 is arranged on the optical axis O of the photographing lens 101 at a position where an object image is formed, and is configured to convert the object image photoelectrically and to output image data to the body control section 203.

The body control section 203 includes a control section such as a CPU and is configured to control the camera body 200 in accordance with programs memorized in a non-illustrated memory section and to control the whole cameral system while communicating with the lens control section 105. The body control section 203 and the lens control section 105 exchange control commands and lens data, such as a zoom position, through the communication terminals 300 with each other.

The focus detecting section 205 is configured to perform contrast AF, and to detect an in-focus position of the photographing optical system by a so-called hill-climbing method. In concrete terms, the focus detecting section 205 extracts the contrast of an object image formed through the photographing lens 101 by using image data output from the imaging sensor 201 while changing a focus position of the photographing lens 101, and calculates a focus lens position (in-focus position) at which the contrast becomes a peak (refer to FIG. 5).

A zoom position memory section 207 is coupled to the body control section 203, and configured to memorize a zoom position which is transmitted from the lens control section 105 and received by the body control section 203. At the time of memorizing the zoom position, the zoom position memory section 207 memorizes the zoom position and an in-focus position at the time of focus detection at the focus detecting section 205 as a set. When transmitting an in-focus position calculated by the focus detecting section 205 to the lens control section 105, the body control section 203 transmits a memory zoom position memorized in the zoom position memory section 207 to the lens control section 105.

Figure 2:
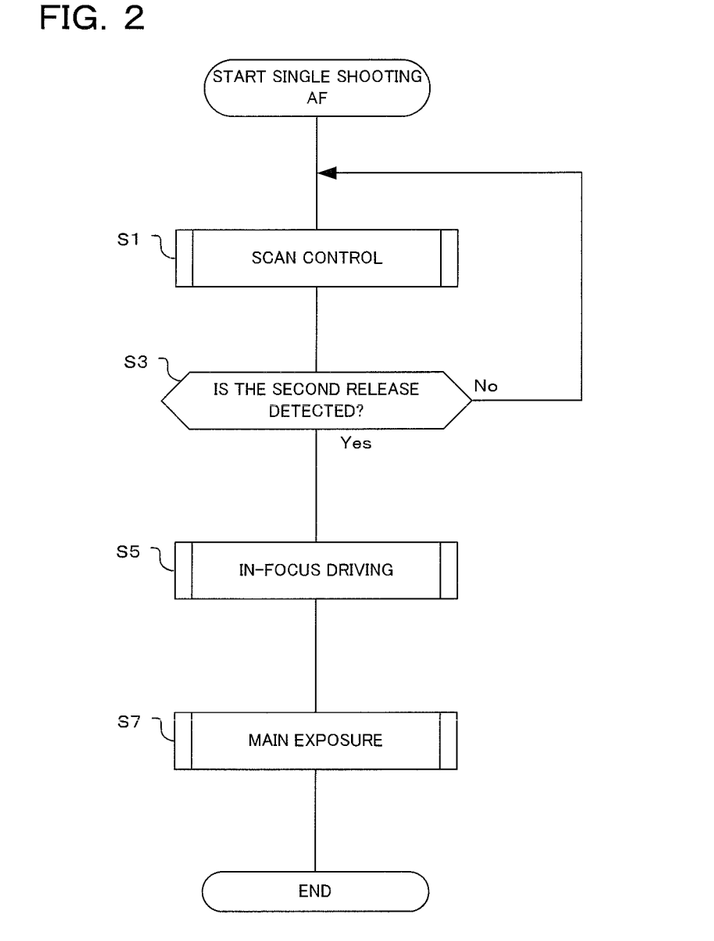
FIG. 2 is a flowchart showing the operations of the camera system according to one embodiment of the present invention.
Figure 3:
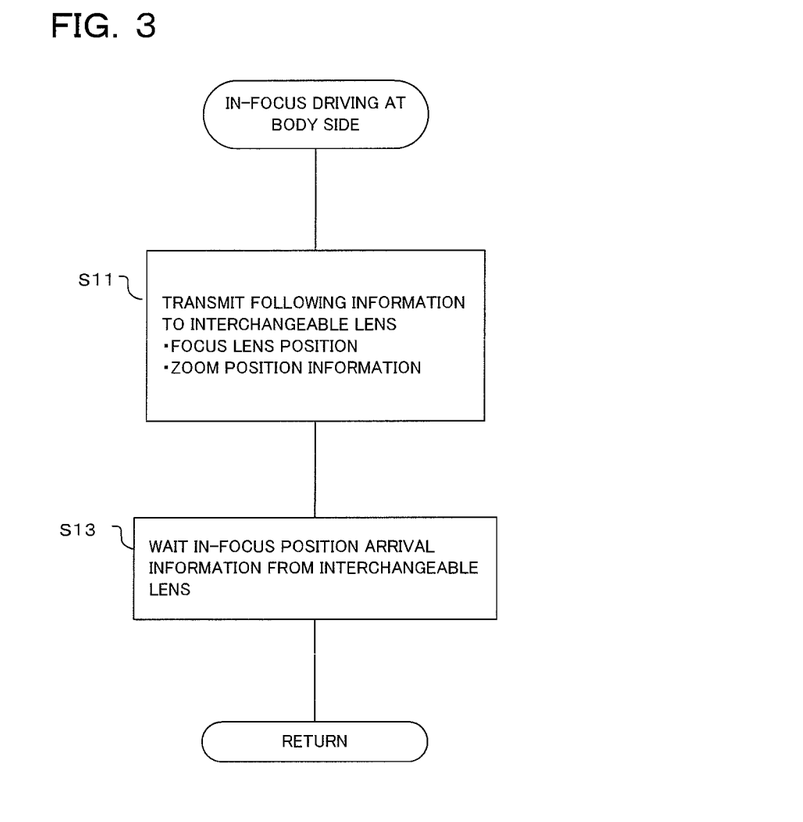
FIG. 3 is a flowchart showing an in-focus operation at the camera body side of the camera system according to one embodiment of the present invention.
Figure 4:
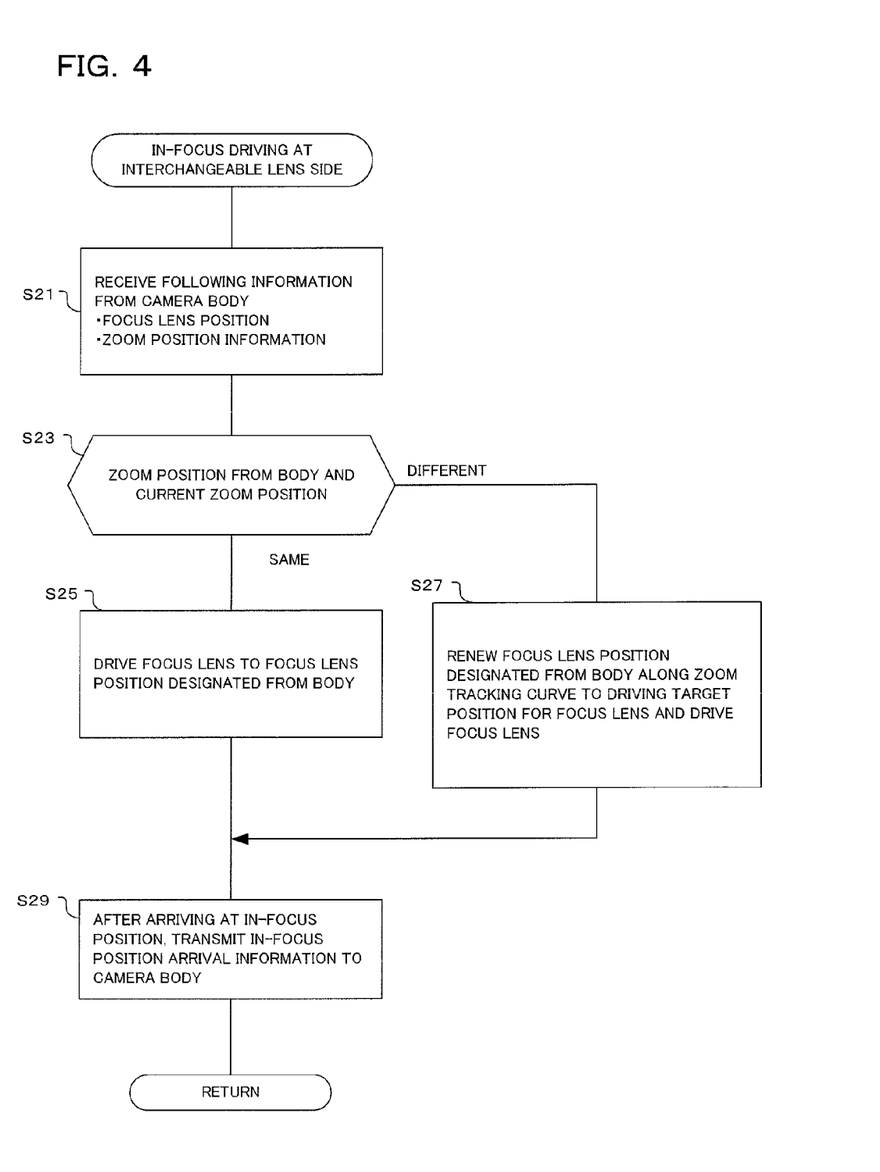
FIG. 4 is a flowchart showing an in-focus operation at the interchangeable lens side of the camera system according to one embodiment of the present invention.

Next, with reference to a flowchart shown in each of FIGS. 2 and 4, description is given to an AF operation in this embodiment. A flow shown in each of FIGS. 2 and 3 is executed by the body control section 203, and a flow shown in FIG. 4 is executed by the lens control section 105. As an AF operation in this embodiment, a case where single shooting AF (continuous AF) is set is exemplified. However, the embodiment can be applied to single shooting AF configured to perform a single AF operation. Further, by repeating this single shooting AF continuously, it is also possible to perform continuous shooting AF (continuous AF).

When an AF operation is started, first, scan control is performed (S1). Here, the body control section 203 controls the lens control section 105 so as to drive the photographing lens 101 from the closest side toward the infinite side or from the infinite side toward the closest side, and calculates a contrast (evaluation value) at each of focus lens positions as shown in FIG. 5 (each evaluation value is indicated with a white circle in FIG. 5).

Figure 5:
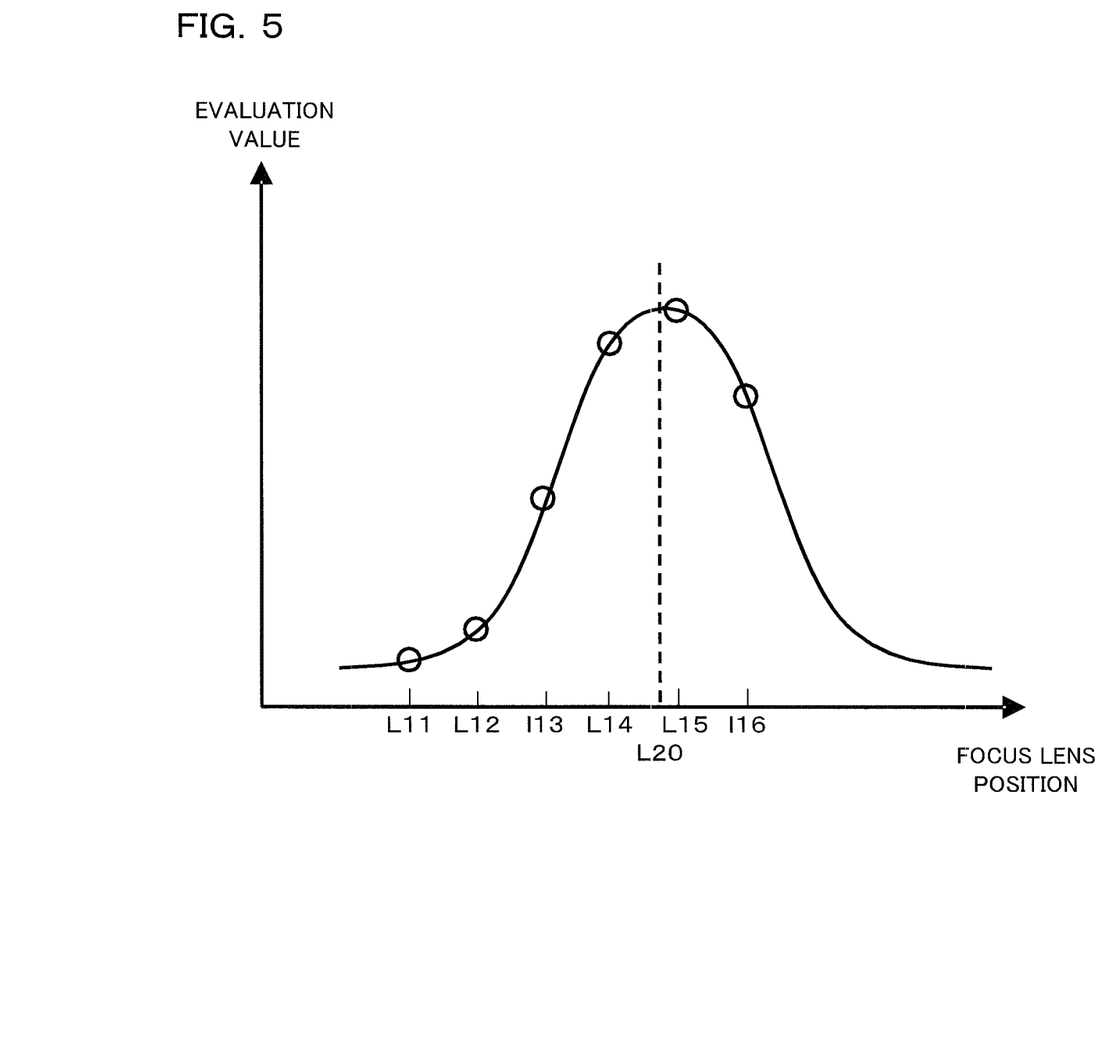
FIG. 5 is a graph showing a relationship between a focus lens position and an evaluation value at the time of contrast AF in the camera system according to one embodiment of the present invention.

In the example shown in FIG. 5, now, it is supposed that the focus lens position of the photographing lens is moved in the direction from L11 to L12, L13, . . . . When the focus lens position becomes from L11 to L15, the evaluation value increases. Successively, when the focus lens position becomes to L16, the evaluation value decreases. Then, the focus detecting section 205 calculates an in-focus position L20 based on the focus lens position and the evaluation value at each of three points of the focus lens positions L14, L15, and L16.

After performing the scanning control, next, it is judged whether the second release has been detected (S3). When a user performs photographing, the user fully depresses a non-illustrated release button. Accordingly, here, it is judged whether or not a second release switch has been turned ON in response to the full depression of the release button. As a result of this judgment, when the second release has not been detected, the flow returns to Step S1. In this case, the scan control is repeated so as to calculate an in-focus position L20 and to obtain a newest in-focus position always.

As a result of the judgment at Step S3, when the second release has been detected, next, in-focus driving is performed (S5). Since the second release has been detected, a main exposure (photographing for recording a photographed image on a non-illustrated recording medium) is performed. However, before the main exposure, the photographing lens 101 is driven to the in-focus position. Then, if zooming is performed during the in-focus driving (moving the photographing lens 101 from a position P1 to a position P2), there is the problem described above with reference to FIG. 7. In order to prevent this problem, in the present embodiment, at the time of transmitting an in-focus position to the lens control section 105, the memory zoom position memorized in the zoom position memory section 207 is transmitted to the lens control section 105. Then, by using the in-focus position and the memory zoom position, in the case where it is judged that a zoom operation has been performed during the in-focus driving, the lens control section 105 is configured to drive the photographing lens 101 to a corrected in-focus position. The detailed operation of the in-focus driving will be described later with reference to FIGS. 3 and 4.

At Step S5, after performing the in-focus driving, next, a main exposure is executed (S7). Here, image processing for recording is applied to image data output from the imaging sensor 201, and then, the image data subjected to the image processing are recorded on a record medium. After performing the main exposure, the basic sequence is ended.

Next, with reference to a flowchart shown in FIG. 3, description is given to a detailed operation at the camera body side in the in-focus driving at Step S5. When the flow of the in-focus driving is started, first, information on a focus lens position and information on a zoom position are transmitted to the interchangeable lens (S11). Here, the body control section 203 makes the in-focus position L20 (focus lens position) calculated by the focus detecting section 205 at the time of the scan control and the memory zoom position memorized in the zoom position memory section 207 into one set, and transmits them to the lens control section 105 via the communication terminals 300. Here, the memory zoom position is a zoom position of the photographing lens 101 which has been detected by the zoom position detecting section 109 when the focus detecting section 205 was performing focus detection and has been transmitted from the lens control section 105 to the body control section 203.

At Step S11, after the information on the focus lens position (in-focus position) and the like have been transmitted, in the interchangeable lens 100, lens driving toward the received in-focus position is performed. This detailed operation will be described later with reference to FIG. 4.

Further, in the interchangeable lens 100, when the photographing lens is driven and arrives at the in-focus position, in-focus position arrival information is transmitted to the camera body. Accordingly, the camera body waits this in-focus position arrival information (S13). Upon receipt of the in-focus position arrival information, the in-focus driving at the body side is ended, and the flow returns to the original flow.

Next, with reference to a flowchart shown in FIG. 4, description is given to the detailed operation at the interchangeable lens side in the in-focus driving at Step S5. When the flow of the in-focus driving at the interchangeable lens side is started, first, the lens control section 105 receives information on a focus lens position and information on a zoom position from the camera body 200 (S21). At Step S21, the lens control section 105 waits information on a focus lens position and information on a zoom position transmitted from the camera body 200. Upon receipt of them, the lens control section 105 memorizes the two pieces of information temporarily.

Upon receipt of the two pieces of information at Step S21, next, the lens control section 105 judges whether the zoom position from the body and a current zoom position are different from or the same with each other (S23). Here, the lens control section 105 compares the zoom position information (memory zoom position) received at Step S21 with a current zoom position detected by the zoom position detecting section 109, and judges whether both zoom positions are different from or the same with each other. If the zoom ring 111 is operated after a time point when the focus detecting section 205 of the camera body 200 has detected an in-focus position, both zoom positions are different from each other.

As a result of the judgment at Step S23, in the case where both zoom positions are the same with each other, the focus lens is driven to the focus lens position designated from the camera body (S25). Since the zoom position at a time point when focus detection has been achieved and the current zoom position are the same with each other, the lens control section 105 controls the lens driving section 103 so as to drive the photographing lens 101 to the focus lens position (in-focus position L20) transmitted from the camera body 200. In the example shown in FIG. 6, since the focal length F1 does not change, at a current position P1, the focus lens is driven toward the detected in-focus position P2.

On the other hand, as a result of the judgment at Step S23, in the case where both zoom positions are different from each other, the focus lens position designated from the camera body is renewed along a zoom tracking curve to a driving target position of the focus lens, and then the lens is driven (S27). Here, the lens control section 105 corrects the focus lens position (in-focus position) based on the zoom position output from the zoom position detecting section 109, the focus lens position (in-focus position) designated from the camera body 200, and the information about the zoom tracking curve memorized in the memory section 107. In the example shown in FIG. 6, since the focal length changes from F1 to F2, by using the tracking curve FLp corresponding to the in-focus position P2, the focus lens position P3 corresponding to the focal length F2 is obtained. Successively, the focus lens position is changed (renewed) from P2 to the corrected P3, and then, the lens driving is performed.

At Step S25 or S27, after the focus lens driving has been performed, next, focusing position arrival information is transmitted to the camera body (S29). After the lens control section 105 has driven the photographing lens 101 to the focus lens position at Step S25 or S27, the lens control section 105 transmits the arrival at the in-focus position to the camera control section 203. Upon receipt of this in-focus position arrival information (S13 in FIG. 3), the camera control section 203 ends the flow of the in-focus driving, and returns to the original flow.

As described in the above, the camera system in one embodiment of the present invention includes the interchangeable lens 100 having the photographing optical system capable of changing a focal length and the camera body 200 to which the interchangeable lens 100 can be detachably attached. Further, the interchangeable lens 100 includes the zoom position detecting section 109 to detect a zoom position corresponding to a focal length of the photographing optical system, and the lens control section 105 to input a zoom position and to transmit it to the camera body 200. The camera body 200 includes the body control section 203 to communicate with the lens control section 105, the focus detecting section 205 to detect an in-focus position of the photographing optical system, and the zoom position memory section 207 to memorize a zoom position which has been transmitted from the lens control section 105 and received by the body control section. Then, at the time of transmitting an in-focus position to the lens control section 105, the body control section 203 transmits a memory zoom position memorized in the zoom position memory section 207 to the lens control section 105. For this reason, since the memory zoom position and the in-focus position at the time of having detected the in-focus position are transmitted as a set to the lens control section 105, even if a focal length is changed during the driving to the in-focus position, it becomes possible for the lens control section 105 to drive to a true in-focus position.

Further, in one embodiment of the present invention, in the case where a received memory zoom position transmitted from the body control section 203 is different from a zoom position output form the zoom position detecting section 109 different at S23 in FIG. 4), the lens control section 105 corrects the in-focus position (S27). That is, when the zoom positions are different from each other, the in-focus position is corrected so as to drive to a true in-focus position. In this case, the lens memory section 107 memorizes information about a position of the focus lens to maintain an in-focus state for the same object distance in response to a change of the zoom position. Then, based on a zoom position output from the zoom position detecting section 109, an in-focus position, and information about a position of the focus lens output from the lens memory section 107, the lens control section 105 corrects the in-focus position. Moreover, the lens control section 105 corrects the in-focus position by a moving amount of the focus lens corresponding to a difference between a zoom position based on the information about a position of the focus lens output from the lens memory section 107 and a memory zoom position, thereby calculating a target position. The lens control section 105 controls the lens driving section 103 to drive the focus lens to the target position.

Furthermore, in one embodiment of the present invention, the interchangeable lens 100 includes the lens driving section 103 to drive the photographing optical system in the optical axis direction. In the case where the lens control section 105 detects that a zoom position output from the zoom position detecting section 109 changes while the lens driving section 103 is driving the photographing optical system different at S23 in FIG. 4), the lens control section 105 corrects the in-focus position in response to the detected zoom position (S27). In this case, based on a zoom position output from the zoom position detecting section 109, an in-focus position, and information about a position of the focus lens output from the lens memory section 107, the lens control section 105 corrects the in-focus position. Further, the lens control section 105 corrects the in-focus position by a moving amount of the focus lens corresponding to a difference between a zoom position based on the information about a position of the focus lens output from the lens memory section 107 and a memory zoom position, thereby calculating a target position, and controls the lens driving section 103 to drive the focus lens to the above target position.

Moreover, in one embodiment of the present invention, the interchangeable lens 100 includes the lens memory section 107 to memorize information about zoom tracking curves, and based on a zoom position output from the zoom position detecting section 109, an in-focus position, and information about the zoom tracking curves, the lens control section 105 corrects the in-focus position (S27). Accordingly, even if a focal length changes, the in-focus position is corrected, whereby the focus lens can be driven to a true in-focus position.

In addition, in one embodiment of the present invention, the camera body 200 transmits an in-focus position and a memory zoom position of the photographing optical system at the time of focus adjustment to the interchangeable lens 100 (S11, S21), and upon receipt of the memory zoom position, the interchangeable lens 100 compares the memory zoom position with a current zoom position (S23). As a result of the comparison, in the case where the memory zoom position and the current zoom position are different from each other, the in-focus position is corrected (S27). Accordingly, even if a focal length is changed during the driving to the in-focus position, it becomes possible for the lens control section 105 to drive the focus lens to a true in-focus position.

Here, in one embodiment of the present invention, although the driving to the in-focus position is performed only at the time of operating the second release. However, the present invention should not be limited to this embodiment. That is, the driving to the in-focus position may be performed at the time of scan control. At this time, if a zooming operation is performed, the in-focus driving shown in FIG. 3 and FIG. 4 may be made to be performed.

Further, in one embodiment of the present invention, the camera system is constituted by the camera body and the interchangeable lens. However, without being limited to the above embodiment, the camera system may be constituted such that a lens barrel is made in a single body with a camera body.

Furthermore, in one embodiment of the present invention, although the focus detecting section performs focus detection by a so-called hill-climbing method, other focus detection methods, such as a phase difference method, may be adopted. Also, although the zoom tracking curves memorized in the memory section 107 are memorized in the form of tables, coefficients to obtain the curves from calculation formulas such as quadratic equation may be memorized. Moreover, a zooming operation is performed in such a manner that a user operates the zoom ring 111 manually. However, without being limited to this embodiment, the zooming operation may be performed by operating a power zoom operating member provided to a lens barrel, or a camera body.

Moreover, in one embodiment of the present invention, although the description is made by using a digital camera as a device for photography, cameras may be digital single lens reflex cameras and compact digital cameras, may be cameras for animations, such as video cameras and movie cameras, and further may be cameras incorporated in mobile telephones, smart phones, mobile information terminals (PDA: Personal Digital Assist), and game machines. In any case, if devices can perform zooming for a photographing optical system, the present invention can be applied to the devices.

Moreover, among the techniques described in this specification, in many cases, the control described mainly with reference to the flowcharts may be set with programs and may be stored in recording medium or recording sections. Examples of the method of recording the control in the recording medium or the recording sections include a method of recording it at the time of shipment of products, a method of utilizing distributed recording medium, and a method of downloading via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A camera system, comprising:
   an interchangeable lens having a photographing optical system capable of changing a focal length; and
   a camera body to which the interchangeable lens is detachably attached,
   the interchangeable lens comprising:
   a zoom position detecting section configured to detect a zoom position corresponding to a focal length of the photographing optical system; and
   a lens control section configured to input the zoom position and transmit it to the camera body, and
   the camera body comprising:
   a body control section configured to communicate with the lens control section,
   a focus detecting section configured to detect an in-focus position of a focus lens included in the photographing optical system, and
   a zoom position memory section configured to memorize the zoom position which is transmitted from the lens control section and received by the body control section,
   wherein when transmitting the in-focus position to the lens control section, the body control section transmits the memory zoom position memorized in the zoom position memory section to the lens control section.

2. The camera system according to claim 1, wherein in the case where the received memory zoom position transmitted from the body control section is different from a zoom position output from the zoom position detecting section, the lens control section corrects the in-focus position.

3. The camera system according to claim 2, wherein the interchangeable lens includes a lens memory section to memorize information about a position of the focus lens to maintain an in-focus state for the same object distance in response to a change of the zoom position, and wherein the lens control section corrects the in-focus position based on the zoom position output from the zoom position detecting section, the in-focus position, and the information about a position of the focus lens output from the lens memory section.

4. The camera system according to claim 3, wherein the lens control section corrects the in-focus position by a moving amount of the focus lens corresponding to a difference between a zoom position based on the information about a position of the focus lens output from the lens memory section and the memory zoom position, thereby calculating a target position.

5. The camera system according to claim 4,
   the interchangeable lens further comprising a lens driving section configured to drive the focus lens in an optical axis direction, wherein
   the lens control section controls the lens driving section to drive the focus lens to the target position.

6. The camera system according to claim 2,
   the interchangeable lens further comprising a lens driving section configured to drive the focus lens in an optical axis direction, wherein
   the lens control section, in the case of detecting a change of the zoom position output from the zoom position detecting section while the lens driving section is driving the focus lens, corrects the in-focus position in response to the detected zoom position.

7. The camera system according to claim 6,
   the interchangeable lens comprising a lens memory section configured to memorize information about a position of the focus lens to maintain an in-focus state for the same object distance in response to a change of the zoom position, wherein
   the lens control section, based on the zoom position output from the zoom position detecting section, the in-focus position, and the information about a position of the focus lens output from the lens memory section, corrects the in-focus position.

8. The camera system according to claim 7, wherein the lens control section corrects the in-focus position by a moving amount of the focus lens corresponding to a difference between the zoom position based on the information about a position of the focus lens output from the lens memory section and the memory zoom position, thereby calculating a target position, and the lens control section controls the lens driving section to drive the focus lens to the target position.

9. The camera system according to claim 1, wherein the zoom position memory section memorizes a zoom position which has been detected by the zoom position detecting section when the focus detecting section was performing focus detection and has been transmitted from the lens control section to the body control section.

10. The camera system according to claim 1, wherein the zoom position memory section is configured to memorize the zoom position at a time when the in-focus position of the focus lens was detected by the focus detection section.

11. A focus adjusting method for a camera system which includes an interchangeable lens having a photographing optical system capable of changing a focal length and a camera body to which the interchangeable lens is detachably attached, the focus adjusting method comprising the steps of:
   transmitting, by the camera body, an in-focus position of a focus lens included in the photographing optical system at the time of focus adjustment and a memory zoom position to the interchangeable lens, comparing, by the interchangeable lens, the memory zoom position with a current zoom position upon receipt of the memory zoom position, and correcting the in-focus position in the case where the memory zoom position is different from the current zoom position as a result of comparison in the comparing step.

12. The focus adjusting method according to claim 11, wherein the interchangeable lens includes a lens memory section configured to memorize information about a position of the focus lens to maintain an identical in-focus position for a change of the zoom position, and wherein in the correcting of the in-focus position in the comparing step, the current zoom position, the in-focus position, and the information about a position of the focus lens are used.

13. The focus adjusting method according to claim 12, wherein in the correcting step, the interchangeable lens moves the focus lens to the corrected in-focus position.

14. The focus adjusting method according to claim 11, wherein the memory zoom position is a position of a zoom lens of the interchangeable lens at a time when the in-focus position of the focus lens was detected.

* * * * *